US012747111B2

(12) United States Patent
Eve et al.

(10) Patent No.: US 12,747,111 B2
(45) Date of Patent: Sep. 29, 2026

(54) CAN ORIENTATION VERIFICATION SYSTEMS AND METHODS

(71) Applicant: Canpack S.A., Cracow (PL)

(72) Inventors: René Eve, Cracow (PL); Jari Visa, Cracow (PL)

(73) Assignee: Canpack S.A., Cracow (PL)

(*) Notice: Subject to any disclaimer, the term of this patent is extended or adjusted under 35 U.S.C. 154(b) by 89 days.

(21) Appl. No.: 18/293,564

(22) PCT Filed: Aug. 13, 2021

(86) PCT No.: PCT/IB2021/057490

§ 371 (c)(1),
(2) Date: Jan. 30, 2024

(87) PCT Pub. No.: WO2023/017304

PCT Pub. Date: Feb. 16, 2023

(65) Prior Publication Data

US 2024/0336443 A1 Oct. 10, 2024

(51) Int. Cl.

*B65G 43/08* (2006.01)
*B65G 21/20* (2006.01)
*B65G 47/256* (2006.01)

(52) U.S. Cl.

CPC ......... *B65G 43/08* (2013.01); *B65G 21/2036* (2013.01); *B65G 47/256* (2013.01); *B65G 2203/041* (2013.01)

(58) Field of Classification Search

None

See application file for complete search history.

(56) References Cited

U.S. PATENT DOCUMENTS

| | | | | |
|---|---|---|---|---|
| 3,592,329 A * | 7/1971 | Fleischauer | B65G 21/2036 198/689.1 |
| 3,710,922 A * | 1/1973 | Lanphere | B65G 47/256 198/398 |
| 8,905,562 B1 * | 12/2014 | Ghionis | G03B 15/02 362/361 |
| 10,207,835 B2 * | 2/2019 | Wilhelm | B67B 3/064 |

FOREIGN PATENT DOCUMENTS

| | | | |
|---|---|---|---|
| EP | 0132150 A2 * | 1/1985 | B65G 21/2036 |
| JP | H06 331333 A | 12/1994 | |
| JP | H09 58851 A | 3/1997 | |
| JP | 2605581 B2 * | 4/1997 | |
| JP | 2003 072930 A | 3/2003 | |
| JP | 2010 036089 A | 2/2010 | |

OTHER PUBLICATIONS

JP2605581, 1997, Machine Translation, FIT Database, retrieved Sep. 25, 2025 (Year: 1997).*

International Search Report and Written Opinion for PCT/IB2021/057490 mailed May 11, 2022, all pages.

* cited by examiner

*Primary Examiner* — William R Harp

(74) *Attorney, Agent, or Firm* — Kilpatrick Townsend & Stockton LLP

(57) ABSTRACT

A method of monitoring an orientation of objects on a production line may include monitoring, using at least one imaging sensor, a plurality of objects on a production line. The method may include detecting that one object of the plurality of objects is in an improper orientation on the production line based on data from the at least one imaging sensor. The method may include automatically removing the one object from the production line upon detecting that the one object is in an improper orientation.

21 Claims, 8 Drawing Sheets

CAN ORIENTATION VERIFICATION SYSTEMS AND METHODS

CROSS-REFERENCE TO RELATED APPLICATIONS

This application is a 371 National Stage filing of PCT Application No. PCT/IB2021/057490, filed Aug. 13, 2021, which is hereby incorporated by reference in its entirety for all purposes.

FIELD OF THE INVENTION

The present technology relates to components and apparatuses for manufacturing beverage cans. More specifically, the present technology relates to image-based techniques for ensuring that each can produced meets quality control standards.

BACKGROUND OF THE INVENTION

During the manufacturing of beverage cans, the outer surface of the cans may be washed, etched, and/or otherwise prepared prior to the application of any decorations, such as product logos and other information. These processes typically involve spraying uncapped cans with a number of cleaning solutions. After being washed, excess cleaning solution may be removed from the cans using, for example, an air sprayer. Occasionally, during the washing process the force of the spray of cleaning solution may knock one or more of the cans over, which may lead to cleaning solution collecting in the overturned cans. The orientation of the overturned cans may prevent them from being fully washed and dried prior to application of the decorative ink. The resulting residual cleanings solution may cause adhesion issues for the subsequently applied ink and/or a protective lacquer positioned over the ink. Additionally, when overturned cans are dried using air drying, the additional washing solution may be sprayed onto nearby cans, which similarly may cause ink and lacquer adhesion issues with the nearby cans as well. Conventionally, there is no way to detect issues associated with over-spraying/under-drying cans during the manufacturing process. This problem is partially due to the defects (such as peeling ink and lacquer) not being exhibited until the cans are filled with a liquid, e.g., beverage, which typically occurs at a different facility. For example, as part of the filling process, the beverage may be pasteurized, which may involve the beverage and/or cans being heated prior to and/or after filling the cans. The heat from the pasteurization process may cause the ink to peel from improperly prepared cans. As defects are detected only after this point, the defects may lead to a waste of can materials and the beverage dispensed into the can. Therefore, improvements in detecting overspray issues in can manufacturing processes are desired.

BRIEF SUMMARY OF THE INVENTION

Some embodiments of the present invention may encompass methods of monitoring an orientation of objects on a production line. The methods may include monitoring, using at least one imaging sensor, a plurality of objects on a production line. The methods may include detecting that one object of the plurality of objects is in an improper orientation on the production line based on data from the at least one imaging sensor. The methods may include automatically removing the one object from the production line upon detecting that the one object is in an improper orientation.

In some embodiments, the removing may include cutting off a supply of negative pressure to at least a portion of a vacuum bridge that is transporting the one object, thereby causing the one object to fall from the vacuum bridge. The portion of the vacuum bridge may include an area that is greater than an area occupied by the one object such that at least one additional object of the plurality of objects falls from the vacuum bridge. The monitoring may include determining one or both of a brightness and a contrast of each of the plurality of objects. The detecting may include determining that one or both of a brightness and a contrast of the one object does not match a predetermined range. The monitoring may include capturing images of at least a portion of the plurality of objects at periodic intervals. The methods may include sending a signal from the imaging sensor to an object removal mechanism that causes the object removal mechanism to remove the one object from the production line. The signal may cause the object removal mechanism to remove the one object from the production line after a predefined period of time that corresponds with a time needed for the one object to move from a position in which the one object was detected as being in the improper orientation to a position of the object removal mechanism. The methods may include illuminating the plurality of objects on the production line using a flicker-free light source.

Some embodiments of the present invention may encompass production lines. The production lines may include a conveyor mechanism that is configured to transport a plurality of objects down a portion of the production line. The production lines may include an object removal mechanism positioned proximate the conveyor mechanism. The production lines may include at least one imaging sensor positioned to capture an image of at least a portion of the conveyor mechanism. The production lines may include one or more processors. The production line may include a memory. The memory may have instructions stored thereon that, when executed, cause the one or more processors to detect that one object of the plurality of objects is in an improper orientation on the conveyor mechanism based on data from the imaging sensor. The instructions may further cause the one or more processors to cause the object removal mechanism to remove the one object from the production line upon detecting that the one object is in an improper orientation.

In some embodiments, the object removal mechanism may include a vacuum bridge that is positioned proximate the conveyor mechanism and that is configured to receive at least some of the plurality of objects from the conveyer mechanism. Causing the object removal mechanism to remove the one object may include causing the vacuum bridge to cut off a supply of negative pressure to at least a portion of the vacuum bridge proximate the one object to force the one object to fall from the vacuum bridge. The portion of the vacuum bridge may include a predefined radius around the one object. The image of at least a portion of the conveyor mechanism may be divided into a plurality of regions. The portion of the vacuum bridge may correspond to a region of the plurality of regions in which the one object was detected. At least some of the plurality of regions may overlap with one another. The one object may be detected within an overlap between two regions of the plurality of regions. The portion of the vacuum bridge may correspond to the two regions associated with the overlap. The production lines may include a flicker-free light source directed onto the conveyor mechanism.

Some embodiments of the present invention may encompass production lines. The production lines may include a first conveyor mechanism that is configured to transport a plurality of objects down a portion of the production line. The production lines may include a second conveyor mechanism that is positioned downstream of the first conveyor mechanism. The production lines may include a vacuum bridge configured to transfer at least some of the plurality of objects from the first conveyor mechanism to the second conveyor mechanism. The production lines may include one or more imaging sensors positioned to image at least a portion of the first conveyor mechanism. The production lines may include one or more processors. The production lines may include a memory. The memory may have instructions stored thereon that, when executed, cause the one or more processors to detect that one or more of the plurality of objects are in an improper orientation on the conveyor mechanism based on data from the imaging sensor. The instructions may further cause the one or more processors to cause the vacuum bridge to cut off a supply of negative pressure to at least a portion of the vacuum bridge proximate the one or more of the plurality of objects to force the one or more of the plurality of objects to fall from the vacuum bridge.

In some embodiments, the production lines may include a waste conveyor positioned below the vacuum bridge to collect the one or more of the plurality of objects. The instructions may further cause the one or more processors to determine an amount of time it will take the one or more of the plurality of objects to be transported to the vacuum bridge from a location on the first conveyor mechanism at which the one or more of the plurality of objects were detected as being in the improper orientation. Causing the vacuum bridge to cut off the supply of negative pressure may include sending a signal to the vacuum bridge that causes the vacuum bridge to cut off the supply of negative pressure after the amount of time has elapsed. The one or more of the plurality of objects may include multiple objects. The instructions may further cause the one or more processors to determine a duration for cutting off the supply of negative pressure based on an arrangement of the multiple objects on the first conveyor mechanism such that all of the multiple objects are removed while the supply of negative pressure is shut off. The duration may be determined based on distance between a frontmost object of the multiple objects and a rearmost object of the multiple objects. The production line may include a washer. The production line may include a dryer positioned downstream of the washer. The first conveyor mechanism may be configured to transport the plurality of objects from the washer at least partially to the dryer.

BRIEF DESCRIPTION OF THE DRAWINGS

A further understanding of the nature and advantages of the disclosed technology may be realized by reference to the remaining portions of the specification and the drawings.

Figure 1:
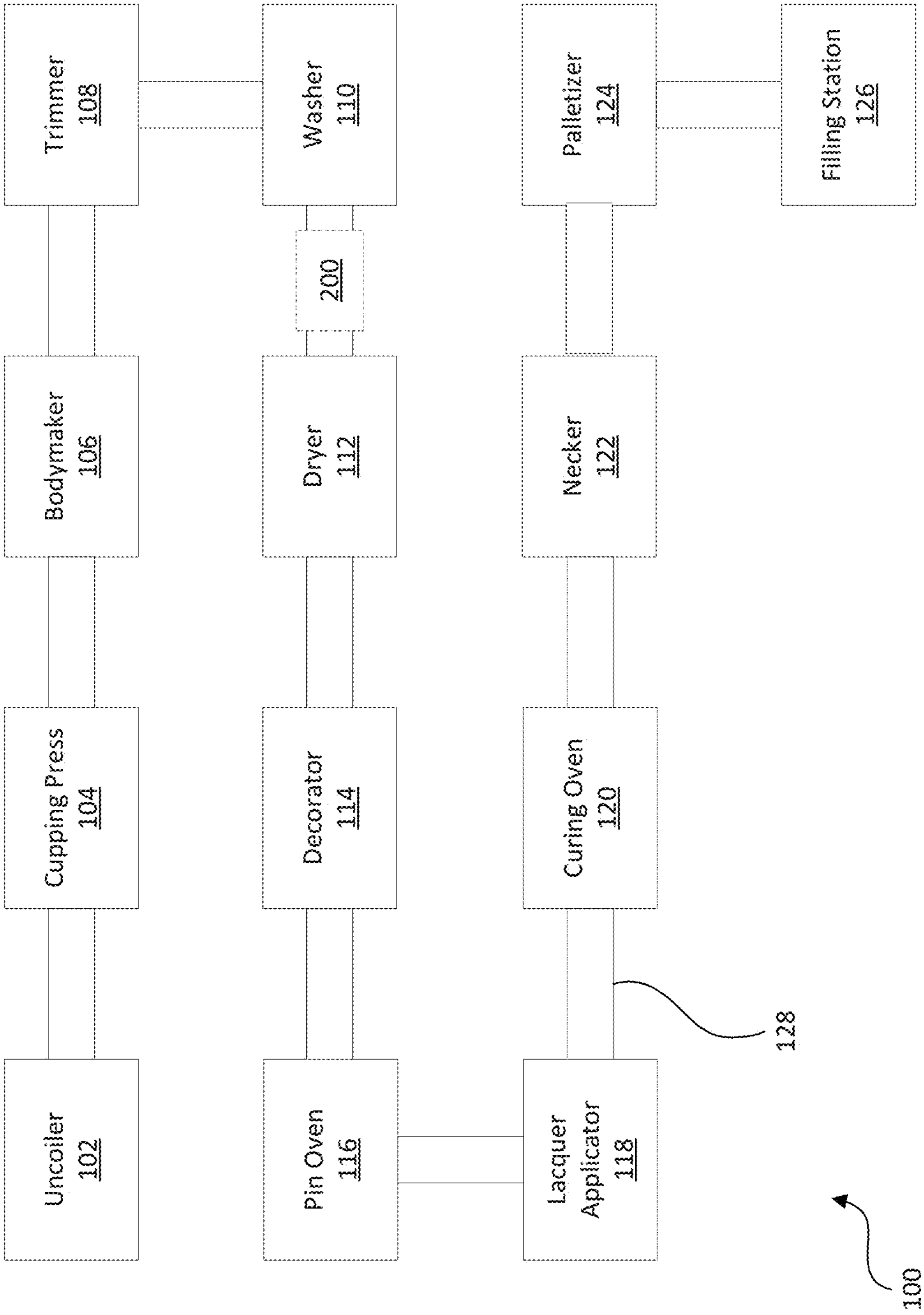
FIG. 1 illustrates a schematic view of a production line 100 for producing beverage cans according to embodiments of the present invention.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

The ensuing description provides exemplary embodiments only, and is not intended to limit the scope, applicability, or configuration of the disclosure. Rather, the description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the present invention are directed to systems and methods for determining whether a beverage can or other production line product has been properly prepared for one or more subsequent processes, such as painting or printing operations. Embodiments may determine when one or more cans within the production line are in an improper orientation (e.g., on their side or with a wrong side facing upward and/or outward for a given manufacturing operation), which may lead to defects, subsequent processing operations being performed incorrectly on the can, and/or may lead to equipment damage and/or other downtime. Embodiments may use one or more imaging sensors to detect cans that are in the improper orientation. Upon detecting improperly oriented cans, a signal may be communicated to one or more removal mechanisms that may remove the improperly oriented cans, and possibly a number of nearby cans, from the production line to ensure that the final cans produced in the production line meet quality control standards.

While described primarily in the context of beverage cans, it will be appreciated that the systems and methods described herein may be utilized in other manufacturing processes in which a visual characteristic (such as orientation, brightness, contrast, color, etc.) of a product or other object may be monitored. Additionally, while described primarily in the context of monitoring cans after washing and surface preparation operations to prevent uneven application of cleaning solutions, it will be appreciated that the techniques described herein may be implemented at other locations within a production line. For example, the techniques may be implemented before, during, and/or after the cans (or other objects) are exposed to some machinery and/or operations that require that the cans (or other objects) be positioned in a certain orientation for a given step. Such orientation verification may ensure that cans are manufactured to high quality control standards, and may also prevent damage and/or downtime needed to adjust or fix machinery that has been affected by the introduction of an improperly oriented can.

FIG. 1 illustrates a schematic view of a production line 100 for producing beverage cans, such as aluminum cans. Production line 100 will be described as including a number of different devices and is merely representative of one example of a production line. It will be appreciated that numerous variations may exist and that functionality described in relation to one or more devices may be combined and performed by a single device in some embodiments, while in other embodiments functionality attributed to a single device may be performed by a number of distinct devices. Additionally, some embodiments may include additional steps and/or omit one or more steps. Production line 100 may include an uncoiler 102 that lubricates sheet metal and feeds the lubricated sheet metal into a cupping press 104. The cupping press 104 may include a punch that punches out disc-shaped blanks from the sheet metal and subsequently forms the blanks into cup-shapes. For example, the flat disc-shaped blanks may be positioned between a drawing die and a blank holder. The drawing die may define a receptacle that is sized to be larger than a final diameter of the finished can. A punch may press a portion of the blank into the receptacle such that the blank is transformed into a cup-shape.

The cup-shaped blank may be transported to a bodymaker 106, which may form a general shape of the can. For example, the bodymaker 106 may position each cup-shaped blank over a re-drawing die, which may have a diameter that approximately matches a diameter of the finished can. A punch may press the cup-shaped blank through the re-drawing die, which increases the height of the blank while reducing a diameter of the blank to be approximately equal to that of the finished can. After re-drawing the blank, a number of ironing stages may be performed on each blank. For example, in some embodiments each can blank may be passed through three or more ironing stages. At each ironing stage, the blank may be positioned over an ironing die that defines a central aperture, with each successive ironing stage having an ironing die that has an inner diameter that is slightly smaller than the outer diameter of the can blank. At each stage, a punch may press the can blank through the ironing die, which causes the can blank to be stretched vertically, while keeping an inner diameter of the blank unchanged. The ironing process may be repeated any number of times until the can blank has a height that is greater than a final height of the finished can. Oftentimes, during the drawing, re-drawing, and/or ironing process, the bodymaker 106 may spray or otherwise supply a lubricating fluid to the can blank to lubricate and cool the can blank during formation of the can body. After ironing, the blank may be domed. For example, the can blank may be positioned over a doming tool that has a convex dome-shaped surface. A punch having a concave lower surface may press a bottom surface of the blank against the doming tool to form a dome-shaped indentation on the bottom of the blank. After the dome-shaped indention is formed, the blank may be transported to a trimmer 108. The trimmer 108 may trim and/or otherwise remove a top end of the blank such that the top end of the blank has a straight top edge and such that the can blank has a desired height.

After trimming, the blanks may be transported to a washer 110. A number of washing and/or etching operations may be performed on each blank to wash away lubricants from the bodymaker 106 and/or to prepare the surface of the can blank for printing. For example, in some embodiments, a six-stage cleaning process may be performed. In some embodiments, each can blank may be sprayed with two stages of an acid wash. For example, the acidic wash may include sulfuric acid (such as from 30%-40% molar $H_2SO_4$) and/or other acid-based cleaning agents, which may etch and/or otherwise remove a thin layer of material from the surface of the can blank. Additional cleaning solutions may include, without limitation, Ridoline 740E, Ridoline 120SNF, Bonderite 404S, and/or Bonderite 77 produced by Henkel of Düsseldorf, Germany.

A number of water washes may be performed on each can blank after the acid wash stages. For example, deionized water may be sprayed and/or otherwise applied to the can blank to rinse away the other cleaning solutions. After washing, the can blanks may be transported to a dryer 112. The dryer 112 may include an oven, air jet, and/or other drying mechanism that may dry the can blanks prior to applying any decoration to the can blank.

The dried can blanks may be transported to a decorator 114, which may apply a decoration (such as a brand name, product name, nutrition information, etc.) to an outer surface of the can blank. The decorator 114 may apply any decoration to the outer surface of the can blank in one or more steps. For example, the decorator 114 may be an 8-color offset machine (or other number of colors) that may apply ink to the outer surface of the can blank using a rotation printing process to generate a desired decoration. After printing the decoration, the decorator 114 may apply an overprint varnish to protect the ink. A bottom of the can may be rim-coated, which may help facilitate rotation and/or other movement of the can blank along the production line. The decorated can blanks may be cured within a pin oven 116 to harden the ink and varnish.

The cured can blanks may be transported to a lacquer applicator 118. The lacquer applicator 118 may apply a food-grade lacquer to an interior surface of each can blank. This lacquer may help ensure that the final beverage and metal do not contact and/or react with one another. For example, the lacquer may prevent a beverage from eating through the metal, and may also prevent materials from the metal from leeching into and/or reacting with the beverage. The lacquer may be dried within a curing oven 120.

The can blanks may then be transported to a necker 122. The necker 122 may shape a top end of the can blank to form a neck. For example, a number of necking stages may gradually narrow the top end of the can blank to form the neck. Each necking stage may include an inner die that is inserted within the can blank and a necking die that is positioned outside the can blank. In each stage, the necking die has a slightly smaller inner diameter so as to slightly bend the top of the can inward to form the neck. In some instances, as many as 11 necking stages may be used to form the neck. Once the neck is formed, a top edge of the neck may be curved over to form a flange that may later be used in sealing the can. After the neck has been flanged, the cans may be transported to a palletizer 124, which may arrange the cans on pallets for transport to a filling facility and/or station 126.

The filling station 126 may be in a same facility as the rest of the production line 100 and/or may be located in a remote facility. For example, a manufacturer of the cans may provide the palletized cans to a bottler, which may fill and seal the cans for shipment to customers. At the filling station 126, each can may be filled with a beverage (or other substance) that corresponds to the decoration and/or other identifier (such as a barcode) that is printed on the can. After the cans are filled, a top, such as a lid having a stay-on tab, may be affixed to the flanged neck of the can. For example, edges of the lid and flanged neck may be crimped together, oftentimes with a sealant disposed therebetween to help seal the can. Prior to and/or during filling, the liquid may be pasteurized to kill bacteria within the can. This process may involve heating the liquid up to a temperature of at least 63° C. in some embodiments. In some embodiments, the pasteurization may include heating the liquid prior to dispensing the liquid into the cans. In other embodiments, once filled, the cans may be heated within a pasteurization oven to heat the liquid inside the cans to the necessary temperature. For example, heated water (such as water at 65° C.-80° C.) may be sprayed on the filled cans to heat the contents of the can. After the cans have reached the necessary temperature, the cans may be cooled prior to palletization, such as by spraying the cans with cool water. This cooling may help prevent the formation of condensation on the outside of the cans, which may damage cardboard used in the palletization/packing process.

Transportation of the cans/blanks between the various devices may be performed by different conveyor mechanisms 128 throughout the manufacturing process. The mechanism chosen for a given stage may depend on a number of lines of cans entering and/or exiting a given device, a desired throughput, a desired orientation of the cans entering and/or exiting a given device, a current state of the cans entering and/or exiting a given device, and/or other factors. Possible conveyor mechanisms may include conveyor belts, vacuum conveyors (such as vacuum bridges), chain conveyors, roller conveyors, chute conveyors, vertical conveyors, wheel conveyors, pneumatic conveyors, and/or other conveyor mechanisms.

The production line 100 may include any number of quality control stations (not shown) positioned at one or more locations along the production line 100. The quality control stations may check for defects within the cans and ensure that each can meets a required quality control standard. The quality control stations may include one or more sensors (such as imaging sensors, scales, coating thickness gauges, enamel raters, tension meters, and the like) that may be used to determine whether individual cans meet the quality control standards. For example, the sensors may detect a wall thickness of the cans, a dome depth, can weight, proper diameters of the cans, a can height, presence of varnish and/or lacquer, quality of decoration (possibly including a barcode and/or other identifier), presence of a bottom rim coating, packaging quality, and the like. The quality control stations may be positioned after a given operation (e.g., checking a thickness of varnish and/or lacquer immediately after application/curing) and/or may be positioned at a later stage of the production line 100. For example, in some embodiments one or more quality control stations may be positioned just prior to the palletizer 124, such that the sensors may detect any defects that have occurred during production prior to the cans being loaded onto a pallet for shipment to a customer and/or filling. Similarly, one or more quality control stations may be positioned along the filling station 126 to ensure that the cans meet quality control standards prior to, during, and/or after filling of the can.

Production line 100 may include one or more removal mechanisms (not shown) that may be positioned at one or more points along the production line 100. The removal mechanisms may be used to remove defective and/or otherwise imperfect cans from the production line 100. For example, if one of the quality control stations determines that a given can or group of cans does not meet a predetermined quality control standard, a removal mechanism may remove the can or group of cans from the production line 100. In some instances, only those cans that have been determined to not meet quality control standard may be removed, while in other embodiments a section of cans proximate the defective can or cans may also be removed. The removal of additional cans proximate the defective can may be particularly useful in some instances. For example, cans that are improperly oriented on a piece of equipment may lead to collateral damage to nearby otherwise good cans. The removal mechanisms may take many forms, such as air guns, vacuum bridges, mechanical arms, magnetic rejection system (for packaging materials that are ferromagnetic), and/or other known removal mechanisms.

Figure 2A:
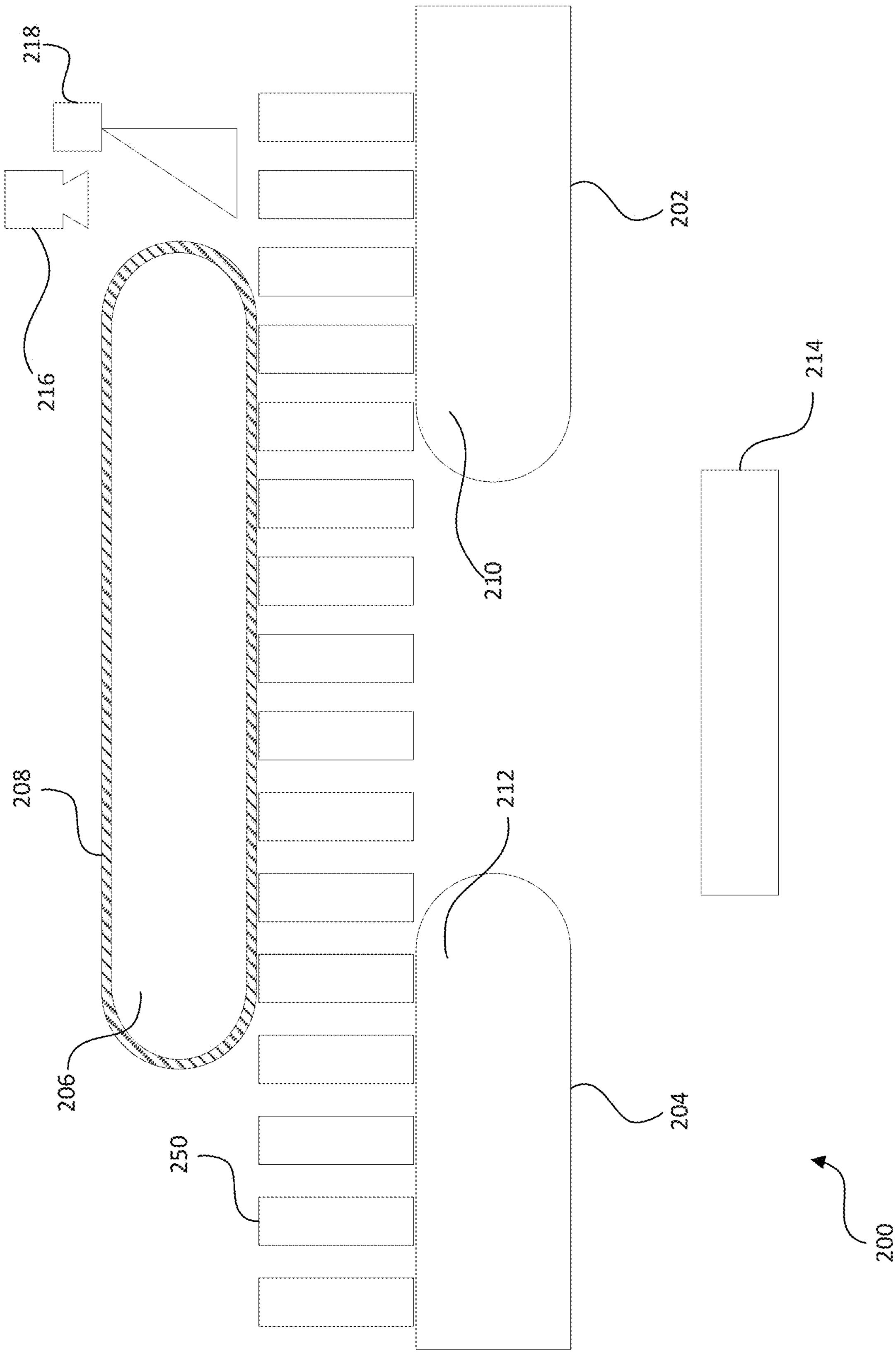
FIG. 2A illustrates a schematic partial cross-sectional view of a production line according to embodiments of the present invention.
Figure 2B:
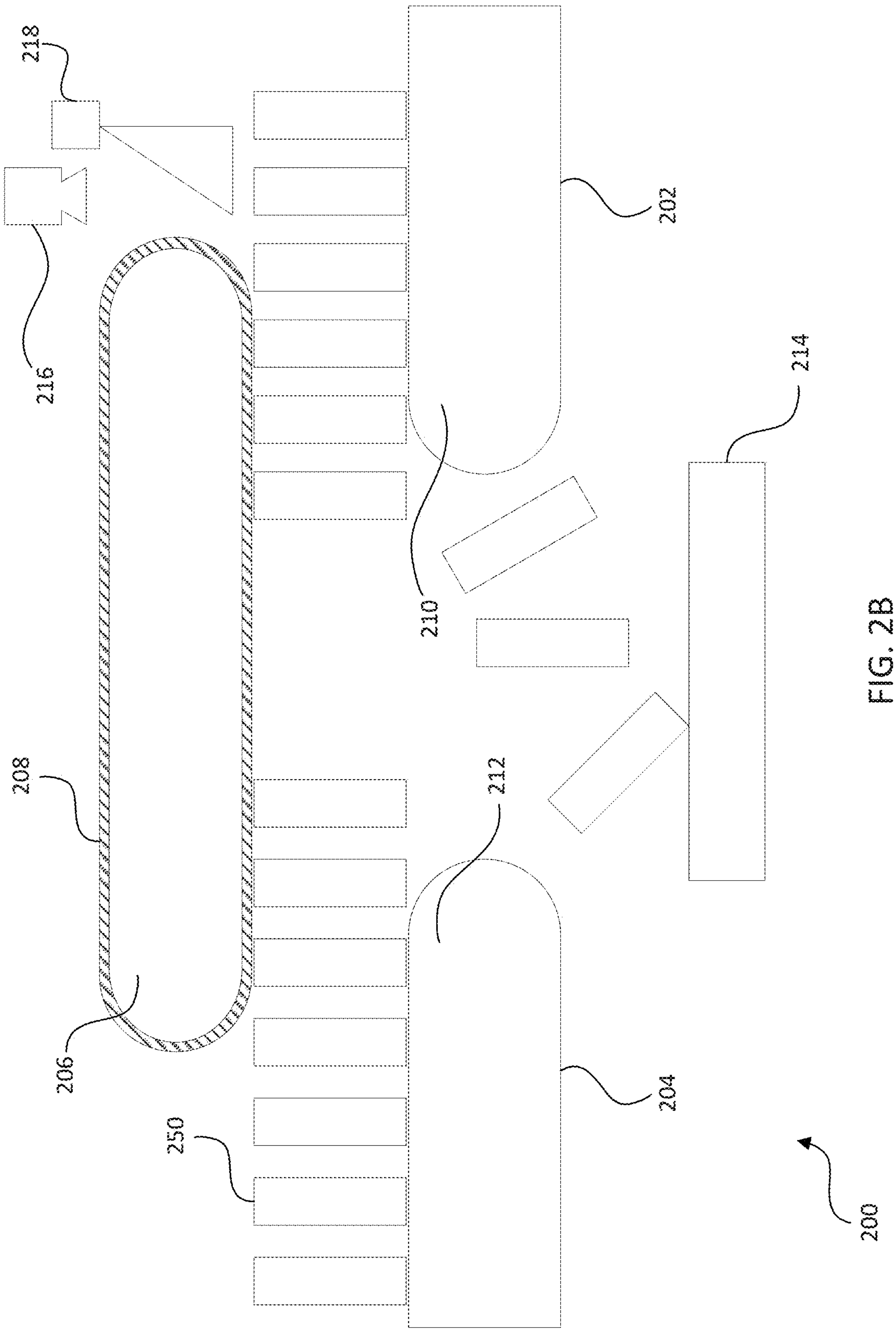
FIG. 2B illustrates the production line of FIG. 2A during actuation of a removal mechanism according to embodiments of the present invention.

FIGS. 2A and 2B show schematic partial cross-sectional views of an exemplary production line 200 according to some embodiments of the present technology. FIGS. 2A and 2B may illustrate further details relating to components in production line 100, such as for a quality control station. Production line 200 is understood to include any feature or aspect of production line 100 discussed previously in some embodiments. The production line 200 may be used to manufacture cans as previously described, as well as other products and objects. Production line 200 may show a partial view of the production line components being discussed and that may be incorporated in a larger manufacturing system. Any aspect of production line 200 may also be incorporated with other production lines or manufacturing systems as will be readily understood by the skilled artisan.

Production line 200 may include a first conveyor mechanism 202 that may transport a number of objects, such as beverage cans, down a portion of the production line 200. The first conveyor mechanism 202 may be positioned proximate an output of a manufacturing device and may transport cans from the manufacturing device downstream to another station of the production line 200. As just one example, the first conveyor mechanism 202 may be positioned after the washer 110 and/or dryer 112 of production line 100 and may transport the washed and/or dried cans at least partway to decorator 114 as described above in relation to FIG. 1. The first conveyor mechanism 202 may be any type of conveyor mechanism, such as but not limited to, a belt conveyor or chain conveyor. In the case of cans, the cans may be positioned on the first conveyor mechanism 202 with the domed-bottom end facing up in some embodiments.

A second conveyor mechanism 204 may be positioned downstream of the first conveyor mechanism 202. The second conveyor mechanism 204 may be a same or different type of conveyor mechanism as the first conveyor mechanism. For example, the second conveyor mechanism may be a belt conveyor, chain conveyor, and/or other type of conveyor mechanism. The second conveyor mechanism 204 may be aligned with a longitudinal axis of the first conveyor mechanism 202 and/or may be offset and/or oriented in a different direction than the first conveyor mechanism 202. The second conveyor mechanism 204 may receive and transport those cans from the first conveyor mechanism 202 that meet certain quality control standards. For example, cans that have been evenly washed and sufficiently dried from the washer and/or dryer may be transferred from the first conveyor mechanism 202 to the second conveyor mechanism 204.

In some embodiments, production line 200 may include a vacuum bridge 206 (or other object removal and/or transfer mechanism) to facilitate transfer of acceptable cans from the first conveyor mechanism 202 to the second conveyor mechanism 204. The vacuum bridge 206 may be positioned over a portion of each of the first conveyor mechanism 202 and the second conveyor mechanism 204. The vacuum bridge 206 may include a moving grid 208 that defines a number of openings therethrough. The grid 208 may move in a direction that connects an outlet end 210 of the first conveyor mechanism 202 with an inlet end 212 of the second conveyor mechanism 204. The vacuum bridge 206 may selectively activate a negative pressure source that draws air upward through the openings in the grid 208 to draw individual ones of the cans upward against a surface of the grid 208. For example, cans approaching the outlet end 210 may be drawn upward against the grid 208 and transported to the inlet end 212 as shown in FIG. 2A. Once sufficiently onto the inlet end 212, the cans may go past the vacuum area and may be set down atop the inlet end 212 for transport to a subsequent station of the production line 200. As will be discussed in greater detail below, the vacuum bridge 206 may operate as a removal mechanism. When one or more cans fail to meet one or more quality control standards, the vacuum bridge 206 may receive a signal that causes the negative pressure source to cut off a supply of negative pressure to at least a portion of the vacuum bridge 206. This loss in negative pressure may cause any cans currently being transported by the vacuum bridge 206 and/or reaching a distal end of the first conveyer mechanism 202 to fall as illustrated in FIG. 2B. Once the defective or otherwise unacceptable cans have been removed, the negative pressure source may again apply negative pressure to the grid 208 to continue transporting acceptable cans to the second conveyor mechanism 204.

The production line 200 may include one or more waste collection mechanisms to collect the unacceptable cans for subsequent transport to a recycling center. In some embodiments, the waste collection mechanism may include a bin or chute that collects unacceptable cans. As illustrated, the waste collection mechanism is in the form of a waste conveyor 214 that is positioned below the vacuum bridge 206 and/or the outlet end 210 of the first conveyor mechanism 202. For example, the waste conveyor 214 may be positioned between the outlet end 210 and inlet end 212 such that cans (or other objects) that fall from the outlet end 210 and/or vacuum bridge 206 are collected on the waste conveyor 214. The waste conveyor 214 may then transport the collected cans to a bin or other storage area for subsequent transport to the recycling center.

Production line 200 may include one more imaging sensors 216. Imaging sensors 216 may be positioned to capture images of at least a portion of the first conveyor mechanism 202. For example, each of the imaging sensors 216 may be positioned at a height that is above a top surface of the first conveyor mechanism 202, with the imaging sensor 216 being pointed at a portion of the top surface of the first conveyor mechanism 202. Oftentimes, each imaging sensor 216 may be positioned directly above a portion of the first conveyor mechanism 202 such that the imaging sensor 216 is pointed substantially downward (e.g., within or about 10 degrees of vertical, within or about 5 degrees of vertical, within or about 3 degrees of vertical, within or about 1 degree of vertical, or less). This positioning may enable the imaging sensors 216 to capture images of the entire bottom surface of properly oriented cans such that the captured images show properly oriented cans as being substantially circular in shape.

In some embodiments, the imaging sensors 216 may be cameras, such as digital cameras that include charge-coupled device (CCD) and/or complementary metal-oxide-semiconductor (CMOS) sensors and/or may include other types of imaging sensors that can perform processing operations such as object detection, brightness/color/contrast detection, and the like. The imaging sensors 216 may capture still images and/or video images in various embodiments. Any number of imaging sensors 216 may be used in production line 200. For example, production line 200 may include at least or about one imaging sensor, at least or about two imaging sensors, at least or about three imaging sensors, at least or about four imaging sensors, at least or about five imaging sensors, at least or about six imaging sensors, at least or about seven imaging sensors, at least or about eight imaging sensors, at least or about nine imaging sensors, at least or about ten imaging sensors, or more. Regardless of the number of imaging sensors 216 used, the imaging sensors 216 may be arranged to collectively image an entire width (and at least a portion of the length) of the can-bearing portion of the first conveyor mechanism 202 to ensure that all cans transported using the first conveyor mechanism are imaged. Where multiple imaging sensors 216 are utilized, the imaging sensors 216 may be arranged in one more rows above the first conveyor mechanism 202, with the imaging sensors 216 being arranged at regular and/or irregular intervals. In some embodiments, each imaging sensor 216 may be programmed to perform a single task (such as monitoring for a particular shape indicative of an properly oriented object, monitoring one or more optical characteristics of the object, etc.), while in other embodiments some or all of the imaging sensors 216 may perform multiple and/or all monitoring tasks being performed at a given location of the production line 200.

Production line 200 may include a light source 218 that is directed onto the top surface of the first conveyor mechanism 202 to illuminate the cans being imaged by the imaging sensors 216. The light source 218 may be a flicker-free light source, such as a flicker-free light emitting diode (LED). The use of flicker-free lighting may enable the light source 218 to provide constant light intensity at all times, which may cause each can to be illuminated in a consistent manner. In this way, cans within each image captured by the imaging sensors 216 will have consistent optical properties if oriented properly (e.g., the domed-end facing straight upward).

In operation, as cans (or other objects) are transported along the first conveyor mechanism 202, the imaging sensors may capture images (still and/or video) of each of the cans as the cans pass under the imaging sensors 216. The imaging sensors 216 and/or other computing device (not shown) coupled with the imaging sensors 216 may monitor one or more characteristics of each of the cans passing under the imaging sensors 216. For example, the imaging sensors 216 (or other computing device) may monitor whether each can appears as a generally circular shape. This circular shape may be indicative that a can is present and that the can is vertically oriented on the first conveyor mechanism 202 (i.e., either standing on the top end of the can or the bottom end of the can). The imaging sensors 216 may monitor one or more optical characteristics of each can. For example, the imaging sensors 216 may check a brightness level, contrast level, color scale, and/or other optical characteristic of each can. One or more of these optical characteristics may be compared to predefined values or ranges of values. For example, the imaging sensors 216 and/or computing device may be programmed or otherwise supplied with predefined values or ranges of values for one or more of the optical characteristics that are indicative of a can that is properly oriented on the first conveyor mechanism 202. As just one example, if the cans are intended to be positioned with the domed-bottom end facing up, the imaging sensors 216 may detect a light gray colored circular shape for a properly oriented can. If the cans are intended to be positioned with the open top end up, the imaging sensors 216 may detect a darker gray or black circular shape (such as due to the imaging of the deeper interior of the can). Additionally or alternatively, the brightness, color, and/or contrast may be different due to the presence of excess cleaning solution on or in the improperly oriented can. Based on test data, a value or range of values for a brightness level, contrast level, color scale, and/or other optical characteristic associated with properly oriented cans may be determined. These values and/or ranges of values may be provided to the imaging sensor 216 and/or computing device as the predefined values/ranges.

During a production run, as long as the imaging sensors 216 and/or computing device detect only cans in the proper orientation, the vacuum bridge 206 may operate to transfer cans from the outlet end 210 of the first conveyor mechanism 202 to the inlet end 212 of the second conveyor mechanism 204 as shown in FIG. 2A. When the imaging sensors 216 and/or computing device identifies one or more cans (or other objects/substances) that have optical characteristics that do not match the predefined values/ranges, the sensors 216 and/or computing device may send a signal to the vacuum bridge 206 (or other removal mechanism) to remove the identified can(s) from the production line. For example, the signal may cause the vacuum bridge 206 to cut off a supply of negative pressure to at least a portion of the grid 208 for a duration that is sufficient to allow the identified can(s) to fall onto the waste conveyor 214 as shown in FIG. 2B. For example, the imaging sensors 216 and/or computing device may determine an amount of time it will take any improperly oriented cans to be transported to the vacuum bridge 206 from a location on the first conveyor mechanism 202 at which the cans were detected as being in the improper orientation. The amount of time may be based on a distance from the detection location to the vacuum bridge 206 and a rate of speed of the first conveyor mechanism 202. The signal sent from the imaging sensors 216 and/or computing device to the vacuum bridge 206 may cause the vacuum bridge 206 to cut off the supply of negative pressure after the amount of time has elapsed. A duration that the negative pressure is cut off may be based on the number of cans identified as being improperly oriented in a given area. For example, if only one can is identified as being improperly oriented on the first conveyor mechanism 202, the vacuum bridge 206 may cut off supply of negative pressure for a shorter duration than if multiple cans are identified. Once the identified cans have been removed (such as after the duration has elapsed), the vacuum bridge 206 may reactivate the supply of negative pressure to continue transferring cans from the first conveyor mechanism 202 to the second conveyor mechanism 204. By immediately reactivating the negative pressure, the production line 200 may remain in operation even while defective cans are removed. Such operation of the vacuum bridge 206 may enable only known defective cans (and possibly some cans proximate the known defective cans) to be removed and may help maximize throughput while minimizing waste.

In a particular embodiment, the first conveyor mechanism 202 may transport cans from a washer and/or dryer, such as washer 110 and dryer 112. In such embodiments, improperly oriented cans may cause nearby cans to be improperly washed and/or dried, which may lead to printing and/or other defects. The improperly oriented can may cause nearby cans to be over-sprayed, under-sprayed, and/or unevenly sprayed with cleaning solution. For example, an improperly oriented can may collect excess cleaning solution inside the can. After the washing and surface preparation operations, the cans may be sprayed with a jet of air to dry the cans. This jet of air may cause the excess cleaning to be sprayed onto nearby cans, which may result in the improperly oriented can and cans proximate the improperly oriented can being defective. For example, any decorative materials, such as inks, applied to the outside of the can may fail to properly adhere to the can and may begin to peel. This peeling may occur after the cans have been filled with liquid and may result in the waste of the affected cans and the liquid dispensed within the liquid cans.

Figure 3A:
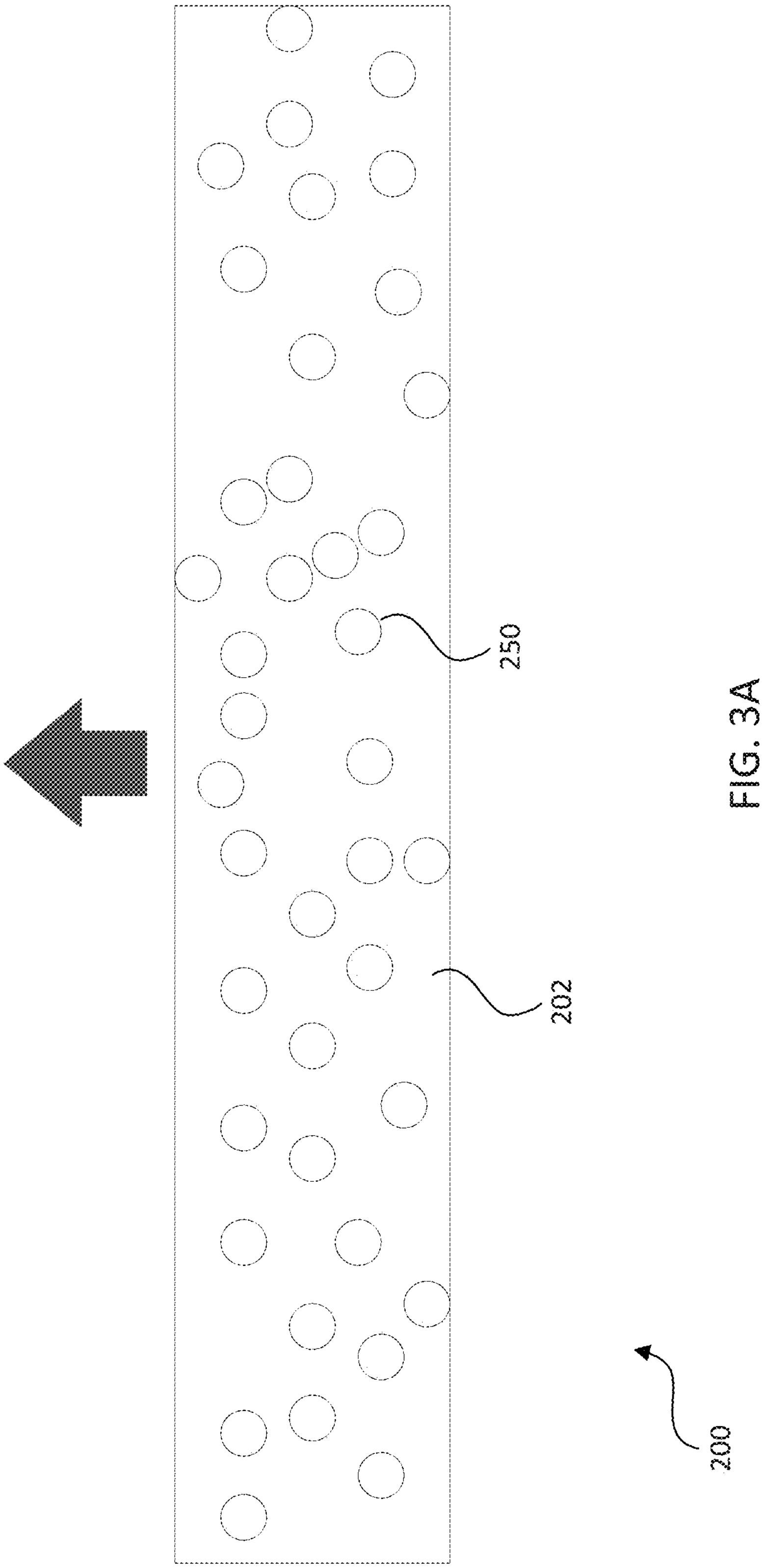
FIG. 3A illustrates a schematic top plan view of a conveyor mechanism according to embodiments of the present invention.
Figure 3B:
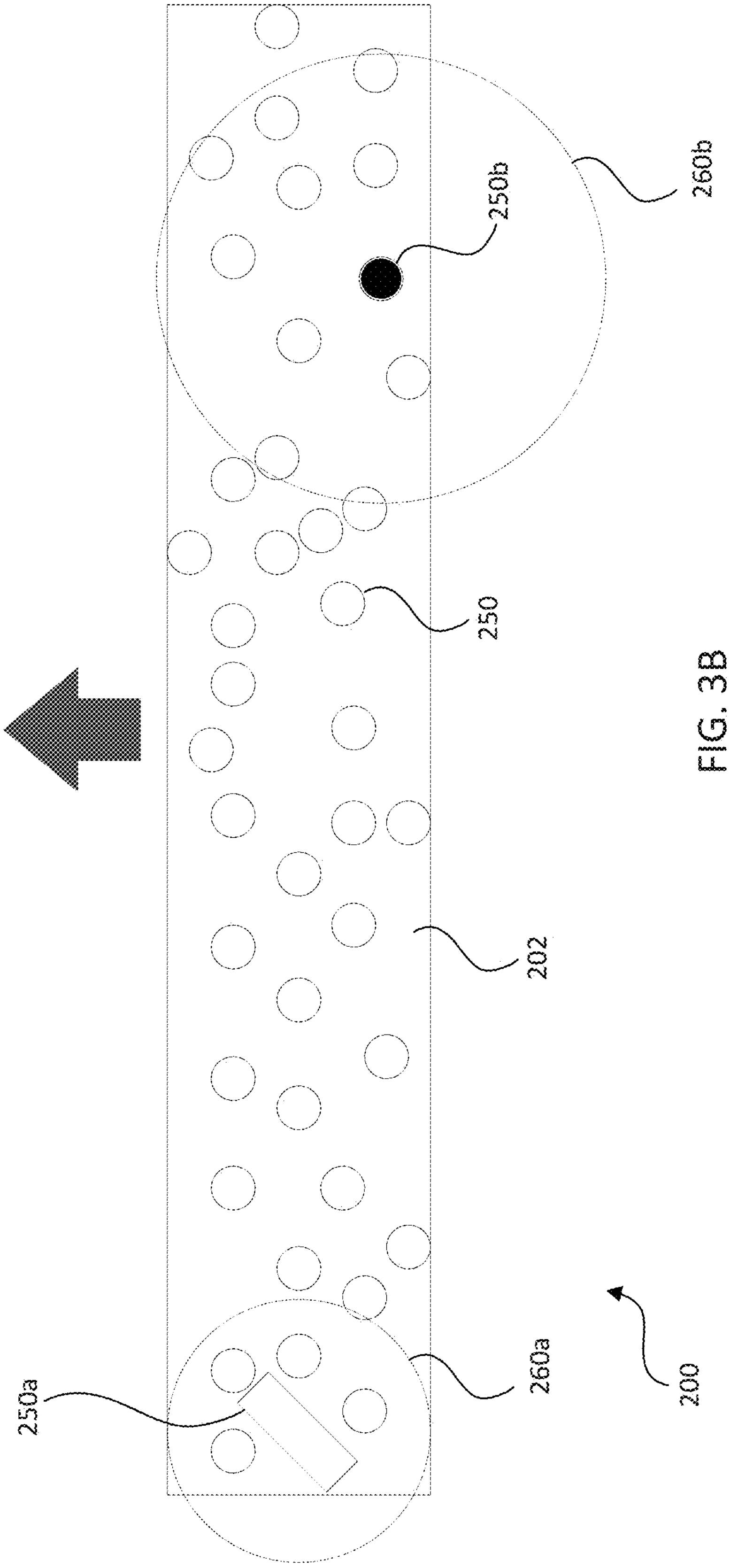
FIG. 3B illustrates a schematic top plan view of a conveyor mechanism with multiple improperly oriented cans according to embodiments of the present invention.
Figure 3C:
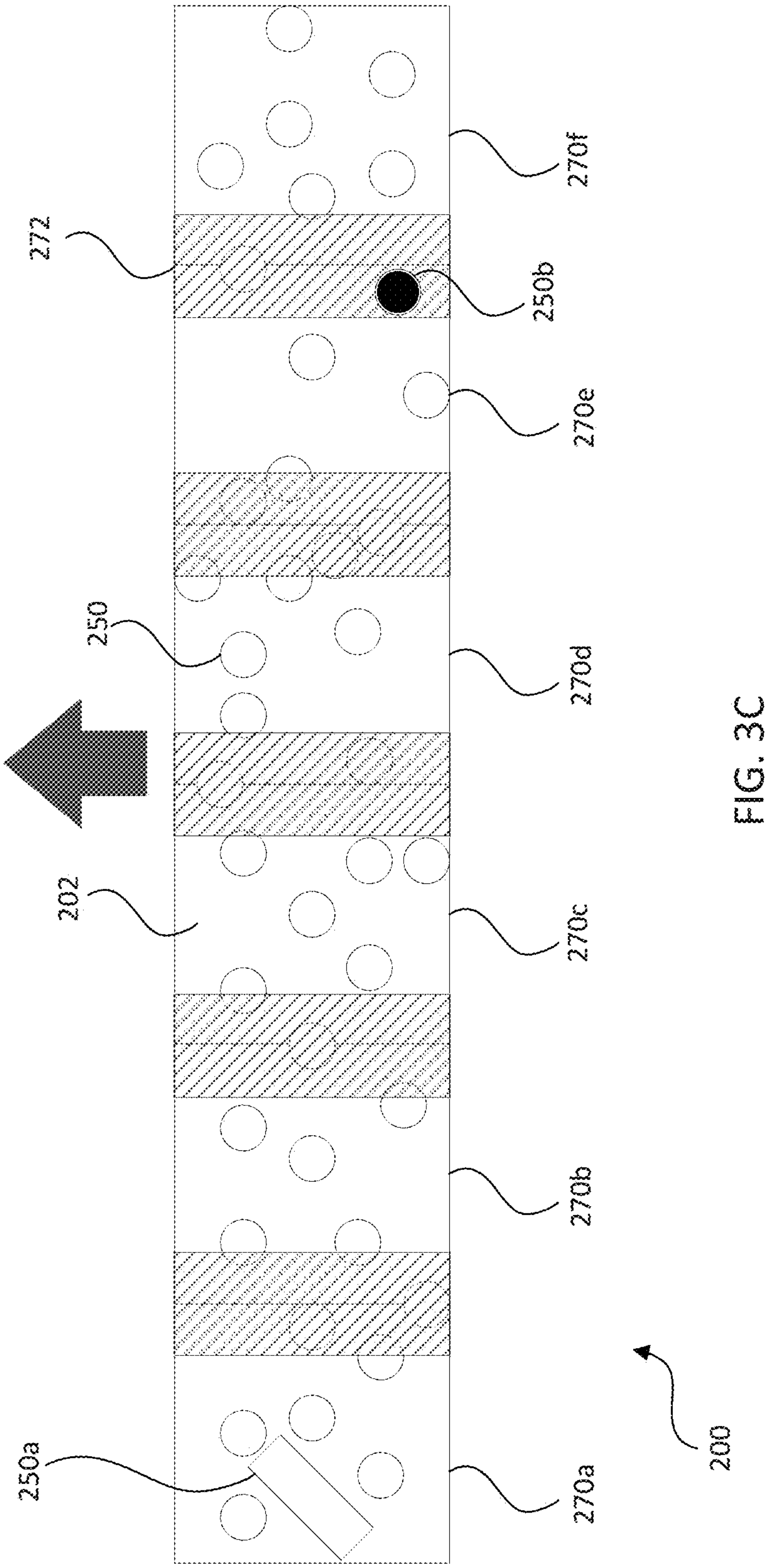
FIG. 3C illustrates a schematic top plan view of a conveyor mechanism with multiple improperly oriented cans according to embodiments of the present invention.

To prevent issues associated with collateral effects of improperly oriented cans, not only are improperly oriented cans removed from the production line 200, but also cans within a certain proximity to the improperly oriented cans. Determining which nearby cans are to be removed may be done in several ways. FIGS. 3A-3C illustrate top plan views of the first conveyor mechanism 202 according to an embodiment of the present technology. The views shown in FIGS. 3A-3C may each represent a view captured by one or more of the imaging sensors 216 in some embodiments. Conveyor mechanism 202 may move in the direction of the arrow. FIG. 3A illustrates a number of cans 250 being transported down the first conveyor mechanism 202, with each of the cans being properly oriented. As illustrated, each of the cans 250 has a same circular shape and a similar set of optical characteristics (e.g., brightness level, contrast level, color scale value, etc.). When the imaging sensors 216 detect only cans 250 having these characteristics (which match the predefined values/ranges), the vacuum bridge 206 may operate in a standard mode, supplying negative pressure to draw the cans 250 upward against moving grid 208 to transfer the cans 250 from the first conveyor mechanism 202 to the second conveyor mechanism 204.

FIG. 3B illustrates cans 250 being transported down the first conveyor mechanism 202, with all but two of the cans 250 being properly oriented. As illustrated, each of the properly oriented cans 250 has a same circular shape and a similar set of optical characteristics (e.g., brightness level, contrast level, color scale value, etc.). However, a first can 250*a* of the improperly oriented cans is positioned on its side, while the second can 250*b* of the improperly oriented cans is positioned on its top end. The first can 250*a* may fail a shape check (e.g., the first can 250*a* appears rectangular, rather than circular in shape) and/or may have a different color, brightness, and/or contrast than the properly oriented cans 250. The second can 250*b* may pass a shape check (e.g., it will still appear circular in shape), however the color, brightness, and/or contrast may not match the predefined values/ranges. For example, the second can 250*b* may have a darker color, uneven appearance (e.g., if the can 250*b* include excess cleaning solution), lower brightness level, higher contrast level, etc. than the properly oriented cans 250. When the imaging sensors 216 and/or other computing device detects one or more cans that do not match the proper shape and/or optical characteristics (e.g., predefined values/ranges), a signal may be communicated to the vacuum bridge 206 that causes the negative pressure to be shut off (either immediately or after a predetermined amount of time to account for a time needed for the imaged cans to move to the vacuum bridge 206) such that the improperly oriented cans 250*a*/250*b* fall to the waste conveyor 214.

To ensure that those cans proximate the improperly oriented cans 250*a*/250*b* are also removed (in case of collateral effects), in some embodiments a predetermined radius may be set around each improperly oriented can. The radius may be determined based on an area within which collateral washing/drying defects are expected. In some embodiments, the radius may be constant for all improperly oriented cans regardless of the actual orientation of the identified can. In other embodiments, the radius may change based on the actual orientation of the identified can. As illustrated, the first can 250*a* may have a first radius 260*a* while the second can 250*b* has a larger second radius 260*b*. This difference in radius size may be due, for example, to the possibility of any excess cleaning solution in the second can 250*b* being sprayed onto nearby cans, however in some embodiments the first radius 250*a* may be the same size or bigger than the second radius 260*b*. All cans within a given radius 260 may be removed from the production line 200. For example, a signal may be sent to the vacuum bridge 206 that causes negative pressure to be cut off from a portion of the vacuum bridge 206 corresponding to the radius 260 once the affected cans reach the vacuum bridge 206. The signal may be delayed and/or include an instruction to delay shutting off of the negative pressure to the vacuum bridge 206 until the cans within a given radius 260 have reached the vacuum bridge 206. For example, the signal may cause the negative pressure to be shut off after a predetermined amount of time from the time of detection to account for a time needed for the imaged cans to move to the vacuum bridge 206. This amount of time may be determined based on a rate of speed of the first conveyor mechanism 202 and a distance between the radius 260 at the time of detection and the vacuum bridge 206. A duration of the negative pressure being shut off may be based on the size of the radius 260 (or distance between cans within the radius 260) and the rate of speed of the cans. For example, the duration may be determined based on a distance between a frontmost can within the radius 260 and a rearmost can within the radius 260. Such a determination may be made for each improperly oriented can detected to ensure that a given radius 260 is generated and the vacuum bridge 206 removes all cans within the radius 260 without removing any other cans.

In some embodiments, rather than relying on a radius to determine which cans 250 to remove around a given improperly positioned can, a zoned approach may be taken as illustrated in FIG. 3C. For example, the view of the first conveyor mechanism 202 captured by the one or more imaging sensors 216 may be divided into a number of zones 270 or regions. The zones 270 may extend across an entire can-carrying width of the first conveyor mechanism 202 and may be mapped to a corresponding area of the vacuum bridge 206. Any number of zones 270 may be used in various embodiments. For example, the first conveyor mechanism 202 may be divided into at least or about 2 zones, at least or about 3 zones, at least or about 4 zones, at least or about 5 zones, at least or about 6 zones, at least or about 7 zones, at least or about 8 zones, at least or about 9 zones, at least or about 10 zones, or more. While illustrated as being rectangular in shape, it will be appreciated that zones 270 may have any shape in various embodiments. In some embodiments, only one row of zones may be provided across the first conveyor mechanism 202, while in other embodiments multiple rows of zones may be utilized. The zones 270 may be sized based on an expected area of collateral effects from an improperly oriented can. For example, each zone 270 may be approximately the same size or slightly larger than a known or expected collateral effect area (such as an area of about 1 foot around the improperly oriented can in all directions). Dimensions of each zone 270 may be at least or about 1% larger than a known collateral effect area, at least or about 3% larger than a known collateral effect area, at least or about 5% larger than a known collateral effect area, at least or about 10% larger than a known collateral effect area, at least or about 20% larger than a known collateral effect area, at least or about 30% larger than a known collateral effect area, at least or about 40% larger than a known collateral effect area, at least or about 50% larger than a known collateral effect area, or more. In some embodiments, the zones 270 may each be the same size, while in other embodiments some or all of the zones 270 may have different sizes. In some embodiments, each imaging sensor 216 may image a single zone 270, while in other embodiments the image from a single imaging sensor 216 may be divided into two or more zones 270. In some embodiments, each zone 270 may be generated using a single imaging sensor 216, while in other embodiments some or all of the zones 270 may be formed from areas imaged using multiple imaging sensors 216.

In some embodiments, adjacent zones 270 may share borders with one another, such that there is a clear delineation between zones 270. In such embodiments, to ensure that those cans proximate the improperly oriented cans are also removed, a relative position of the improperly oriented can within a given zone 270 must be determined. For example, if an improperly oriented can is detected within a middle of a zone 270, removing only the cans from that zone 270 may be sufficient to handle any collateral effects of the improperly oriented can. However, if the improperly oriented can is detected near an edge of a zone 270 (such as within an outer 25% (or other percentage) of the zone), collateral effects may impact cans in a nearby zone 270. Therefore, in such embodiments cans from the nearby zone 270 may also be removed.

To prevent the need to monitor a relative position of an improperly oriented can within a given zone 270, some or all of the zones 270 may overlap with at least one other zone 270 as illustrated in FIG. 3C. Here, each zone 270 overlaps with one or more adjacent zones 270. The amount of overlap of the zones 270 may be determined based on a number of zones used, a size of the zones, a collateral effect area, and/or other factors. For example, the amount of overlap of the zones 270 may be selected such that a collateral effect area may be contained within no more than two zones 270. In some embodiments, adjacent zones 270 may overlap by at least or about 5% (relative to a width of each zone 270), at least or about 10%, at least or about 20%, at least or about 30%, at least or about 40%, at least or about 50%, or more. Improperly oriented cans detected within only one zone (i.e., not within an overlap region 272 of two or more zones), may produce a collateral effect area that is entirely contained within a single zone. For example, as illustrated, a first improperly oriented can 250*a* is positioned only within zone 270*a*. In such an instance, a signal may be communicated to the vacuum bridge 206 that causes the negative pressure in an area of the vacuum bridge 206 that corresponds to zone

270*a* to be shut off (either immediately or after a predetermined amount of time to account for a time needed for the imaged cans to move to the vacuum bridge 206) such that all of the cans within zone 270*a* fall to the waste conveyor 214 while the cans 250 in the remaining zones 270*b*-270*f* are transported to the second conveyor mechanism 204. A second improperly oriented can 250*b* may be detected within an overlap region 272 of zones 270*e* and 270*f*. In such an instance, a signal may be communicated to the vacuum bridge 206 that causes the negative pressure in an area of the vacuum bridge 206 that corresponds to both zones 270*e* and 270*f* to be shut off (either immediately or after a predetermined amount of time to account for a time needed for the imaged cans to move to the vacuum bridge 206) such that all of the cans within zones 270*e* and 270*f* fall to the waste conveyor 214 while the cans 250 in the remaining zones are transported to the second conveyor mechanism 204. The signal may be delayed and/or include an instruction to delay shutting off of the negative pressure to the vacuum bridge 206 until the cans within the given zone(s) have reached the vacuum bridge 206. For example, the signal may cause the negative pressure to be shut off after a predetermined amount of time from the time of detection to account for a time needed for the imaged cans to move to the vacuum bridge 206. This amount of time may be determined based on a rate of speed of the first conveyor mechanism 202 and a distance between the radius 260 at the time of detection and the vacuum bridge 206. A duration of the negative pressure being shut off may be based on the size of the zone 270 (or distance between cans within the zone 270) and the rate of speed of the cans.

While discussed in conjunction with the use of a vacuum bridge, it will be appreciated other removal mechanisms, such as air jets, mechanical and/or pneumatic arms, and the like may be utilized to remove the affected cans. In some embodiments, such removal mechanisms may be used in conjunction with the vacuum bridge, while in other embodiments a different transfer mechanism may be used. In other embodiments, no transfer mechanism may be needed, with the first conveyor transporting the cans to the next manufacturing station of the production line.

Additionally, while described primarily in the context of removing cans after a washing and/or drying operation, it will be appreciated that the orientation detection and removal techniques and devices may be utilized in other areas of the production line in which an improperly oriented can may cause problems with the cooling, filling, printing, rejection, damage to machines, and/or other problems. For example, the can orientation and removal mechanisms described herein may be positioned after the lacquer applicator 118. Cans leaving the lacquer applicator 118 in the wrong orientation will not have any lacquer applied to an interior of the can, which may cause leakage and/or other issues. By positioning the can orientation and removal mechanisms at or near the exit of the lacquer applicator 118, the possibility that an upside down can could have its bottom surface (rather than interior) coated with lacquer may be eliminated.

Figure 4:
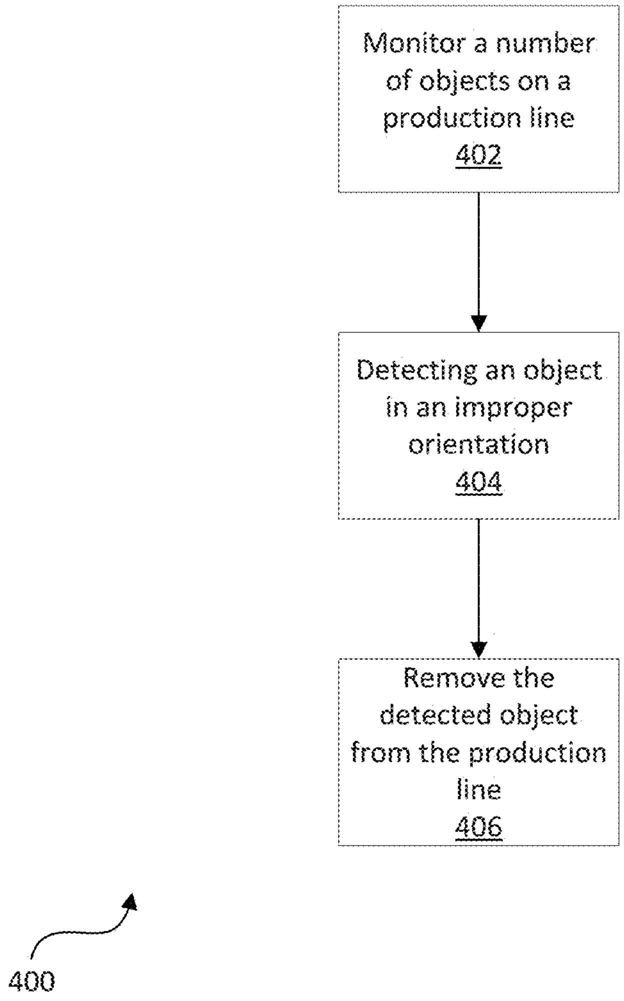
FIG. 4 is a flowchart illustrating a process for monitoring an orientation of objects on a production line according to embodiments of the present invention.

FIG. 4 is a flowchart illustrating a process 400 for monitoring an orientation of objects on a production line. Process 400 may be performed by various devices of a production line, similar to production lines 100 and 200 described herein. For example, various functions of process 400 may be performed using a computing device, imaging sensor, conveyor mechanisms, and/or vacuum bridge (or other removal mechanism). Process 400 may incorporate any of the functionality of such production lines in various embodiments. Process 400 may include a number of optional operations, which may or may not be specifically associated with some embodiments of methods according to the present technology.

Process 400 may begin at operation 402 by monitoring, using at least one imaging sensor (such as imaging sensors 216), a plurality of objects (such as cans 250) on a production line. Each imaging sensor may be positioned at a height that is above a top surface of a conveyor mechanism (such a first conveyor mechanism 202) and may capture still and/or video images of the objects continuously or at periodic intervals. For example, the imaging sensors may be triggered to capture an image at an interval that matches a time needed for an object to pass from one end to the other end of an imaging field of one or more of the imaging sensors. In some embodiments, monitoring the objects may include detecting a shape of the objects within each image. For example, when detecting cans, properly oriented cans may appear as generally circular objects when the imaging sensors are positioned above the conveyor mechanism. Monitoring the objects may include determining a brightness, a contrast, and/or color scale value of each object.

Process 400 may include detecting that one object of the plurality of objects is in an improper orientation on the production line based on data from the at least one imaging sensor at operation 404. Detecting whether an object is in an improper orientation may include determining that the shape of the object does not match an expected shape (such as a circle) and/or that one or more of a brightness, a contrast, and/or color scale value of the object does not match a predetermined value or range of values. For example, a tipped over can may have a generally rectangular shape (rather than a circular shape) when imaged from above. Similarly, a tipped over can or a can that is inverted may have different brightness, contrast, and/or color characteristics (e.g., may be darker, lighter, have a different hue, etc.).

Upon detecting that a particular object (or multiple objects) is improperly oriented, process 400 may include automatically removing the improperly oriented object from the production line at operation 406. As used herein, automatically may refer to functions that are performed without human intervention, such as actions that are triggered by a signal sent from one device to another device. For example, after detecting that a particular object is improperly oriented a signal may be sent from the at least one imaging sensor (or a computing device coupled with the imaging sensors) to an object removal mechanism that causes the object removal mechanism to remove the one object from the production line. The signal may cause the object removal mechanism to remove the improperly oriented object from the production line after a predefined period of time that corresponds with a time needed for the improperly oriented object to move from a position in which the improperly oriented object was detected as being in the improper orientation to a position of the object removal mechanism. For example, the imaging sensor and/or computing device may determine an amount of time it will take the improperly oriented object (and possibly objects nearby) to be transported to the removal mechanism from a location on the first conveyor mechanism at which the one or more of the plurality of objects were detected as being in the improper orientation. The removal mechanism may be actuated after the amount of time has elapsed. As just one example, the removal mechanism may be in the form of a vacuum bridge. In such an embodiment, the signal may cause the vacuum bridge to cut off the supply of negative pressure to at least a portion of the vacuum bridge corresponding to an area of the conveyor mechanism in which the improperly oriented object was detected. For example, the area of the conveyor may be a radius about the improperly oriented object and/or may include one or more zones of the conveyor mechanism as described above. Once the improperly oriented object (and possibly those objects proximate the improperly oriented object) is removed, the vacuum bridge may reactivate the supply of negative pressure to the affected area.

Figure 5:
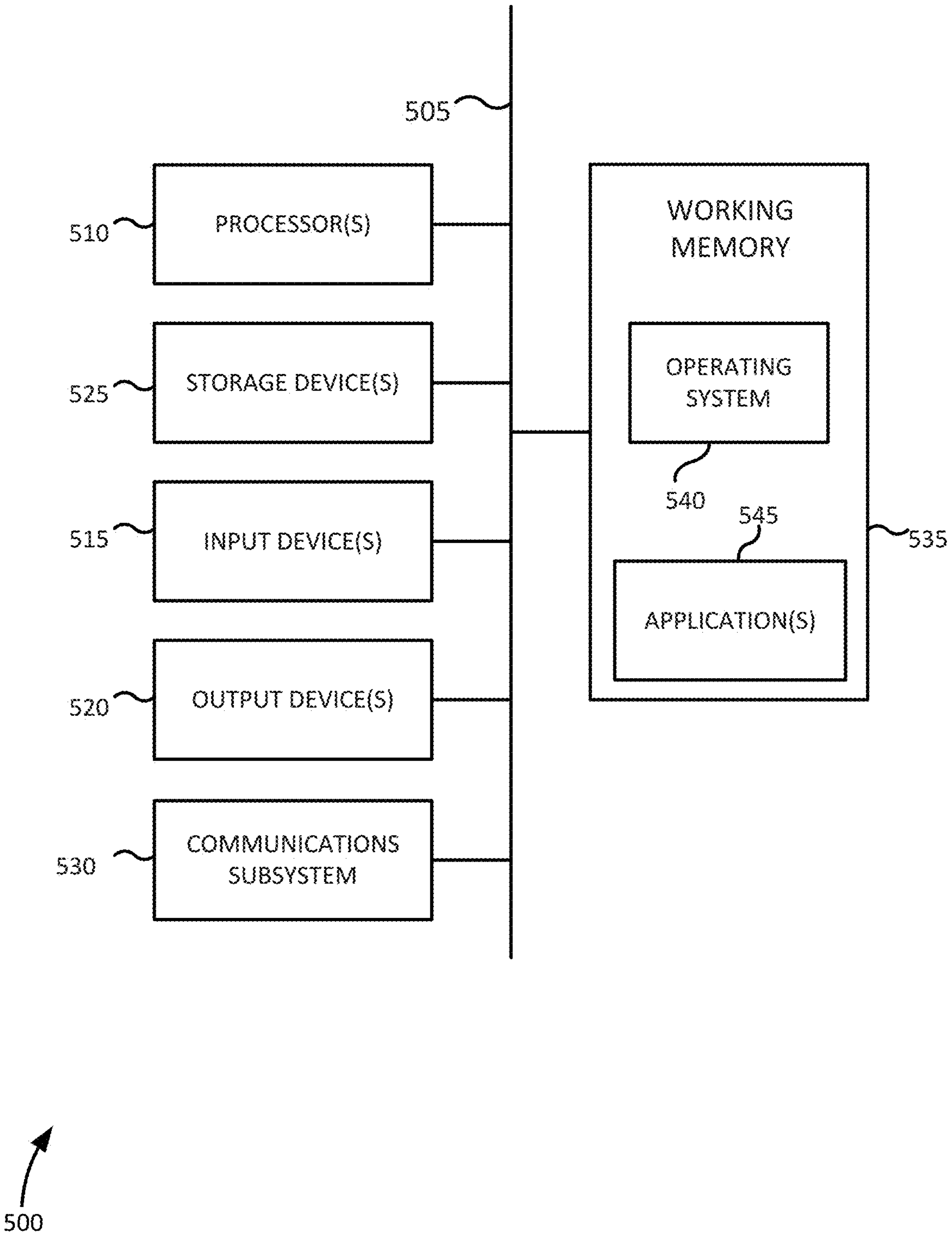
FIG. 5 is a block diagram of a computing system according to embodiments of the present invention.

A computer system as illustrated in FIG. 5 may be incorporated as part of the previously described computerized devices. For example, computer system 500 can represent some of the components of computing devices, such as conveyor mechanisms, imaging sensors 216, removal devices, and/or other computing devices described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors, such as one or more central processing units (CPUs), graphical processing units (GPUs), special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform functions and methods in accordance with the disclosure. For example, some or all of the procedures of the described methods and/or functionality associated with one or more of the devices described herein may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein. Each device described herein (imaging sensor, conveyor mechanism, removal mechanism, other computing device, etc.) may include and/or be coupled with a processing unit 510 that may perform and/or cause the performance of any of the functionality attributed to that device. For example, one or more processing units 510 may detect a shape of the objects within an image, determine a brightness, a contrast, and/or color scale value of each object, determine whether an object is properly oriented on the production line, and/or send a signal to an object removal mechanism that causes the object removal mechanism to remove the one object from the production line. Additional functionality may be performed by one or more processing units 510 in various embodiments.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire, and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processing unit 510.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of monitoring an orientation of objects on a production line, comprising:

monitoring, using at least one imaging sensor, a plurality of objects on a production line;

detecting that one object of the plurality of objects is in an improper orientation on the production line based on data from the at least one imaging sensor, wherein the detecting comprises the at least one image sensor:

detecting that a shape of the one object does not match a shape of a properly oriented object; and detecting that optical characteristics of the one object do not match one or more predefined values; and automatically removing the one object from the production line upon detecting that the one object is in an improper orientation.

2. The method of monitoring an orientation of objects on a production line of claim 1, wherein:

the removing comprises cutting off a supply of negative pressure to at least a portion of a vacuum bridge that is transporting the one object, thereby causing the one object to fall from the vacuum bridge.

3. The method of monitoring an orientation of objects on a production line of claim 2, wherein:

the at least a portion of the vacuum bridge comprises an area that is greater than an area occupied by the one object such that at least one additional object of the plurality of objects falls from the vacuum bridge.

4. The method of monitoring an orientation of objects on a production line of claim 1, wherein:

the monitoring comprises determining one or both of a brightness and a contrast of each of the plurality of objects; and the detecting comprises determining that one or both of a brightness and a contrast of the one object does not match a predetermined range.

5. The method of monitoring an orientation of objects on a production line of claim 1, wherein:

the monitoring comprises capturing images of at least a portion of the plurality of objects at periodic intervals.

6. The method of monitoring an orientation of objects on a production line of claim 1, further comprising:

sending a signal from the at least one imaging sensor to an object removal mechanism that causes the object removal mechanism to remove the one object from the production line.

7. The method of monitoring an orientation of objects on a production line of claim 6, wherein:

the signal causes the object removal mechanism to remove the one object from the production line after a predefined period of time that corresponds with a time needed for the one object to move from a position in which the one object was detected as being in the improper orientation to a position of the object removal mechanism.

8. The method of monitoring an orientation of objects on a production line of claim 1, further comprising:

illuminating the plurality of objects on the production line using a flicker-free light source.

9. A production line, comprising:

a conveyor mechanism that is configured to transport a plurality of objects down a portion of the production line;

an object removal mechanism positioned proximate the conveyor mechanism;

at least one imaging sensor positioned to capture an image of at least a portion of the conveyor mechanism;

one or more processors; and a memory having instructions stored thereon that, when executed, cause the one or more processors to:

detect that one object of the plurality of objects is in an improper orientation on the conveyor mechanism based on data from the at least one imaging sensor, wherein the detecting comprises the at least one image sensor:

detecting that a shape of the one object does not match a shape of a properly oriented object; and detecting that optical characteristics of the one object do not match one or more predefined values; and cause the object removal mechanism to remove the one object from the production line upon detecting that the one object is in an improper orientation.

10. The production line of claim 9, wherein:

the object removal mechanism comprises a vacuum bridge that is positioned proximate the conveyor mechanism and that is configured to receive at least some of the plurality of objects from the conveyer mechanism.

11. The production line of claim 10, wherein:

causing the object removal mechanism to remove the one object comprises causing the vacuum bridge to cut off a supply of negative pressure to at least a portion of the vacuum bridge proximate the one object to force the one object to fall from the vacuum bridge.

12. The production line of claim 11, wherein:

the at least a portion of the vacuum bridge comprises a predefined radius around the one object.

13. The production line of claim 11, wherein:

the image of at least a portion of the conveyor mechanism is divided into a plurality of regions; and the at least a portion of the vacuum bridge corresponds to a region of the plurality of regions in which the one object was detected.

14. The production line of claim 13, wherein:

at least some of the plurality of regions overlap with one another;

the one object is detected within an overlap between two regions of the plurality of regions; and the at least a portion of the vacuum bridge corresponds to the two regions associated with the overlap.

15. The production line of claim 9, further comprising:

a flicker-free light source directed onto the conveyor mechanism.

16. A production line, comprising:

a first conveyor mechanism that is configured to transport a plurality of objects down a portion of the production line;

a second conveyor mechanism that is positioned downstream of the first conveyor mechanism;

a vacuum bridge configured to transfer at least some of the plurality of objects from the first conveyor mechanism to the second conveyor mechanism;

one or more imaging sensors positioned to image at least a portion of the first conveyor mechanism;

one or more processors; and a memory having instructions stored thereon that, when executed, cause the one or more processors to:

detect that one or more of the plurality of objects are in an improper orientation on the conveyor mechanism based on data from the at least one imaging sensor, wherein the detecting comprises the at least one image sensor:

detecting that a shape of the one or more objects does not match a shape of a properly oriented object; and detecting that optical characteristics of the one or more objects do not match one or more predefined values; and cause the vacuum bridge to cut off a supply of negative pressure to at least a portion of the vacuum bridge proximate the one or more of the plurality of objects to force the one or more of the plurality of objects to fall from the vacuum bridge.

17. The production line of claim 16, further comprising: a waste conveyor positioned below the vacuum bridge to collect the one or more of the plurality of objects.

18. The production line of claim 16, wherein the instructions further cause the one or more processors to:

determine an amount of time it will take the one or more of the plurality of objects to be transported to the vacuum bridge from a location on the first conveyor mechanism at which the one or more of the plurality of objects were detected as being in the improper orientation, wherein:

causing the vacuum bridge to cut off the supply of negative pressure comprises sending a signal to the vacuum bridge that causes the vacuum bridge to cut off the supply of negative pressure after the amount of time has elapsed.

19. The production line of claim 18, wherein:

the one or more of the plurality of objects comprises multiple objects; and the instructions further cause the one or more processors to determine a duration for cutting off the supply of negative pressure based on an arrangement of the multiple objects on the first conveyor mechanism such that all of the multiple objects are removed while the supply of negative pressure is shut off.

20. The production line of claim 19, wherein:

the duration is determined based on a distance between a frontmost object of the multiple objects and a rearmost object of the multiple objects.

21. The production line of claim 16, further comprising:

a washer; and a dryer positioned downstream of the washer, wherein the first conveyor mechanism is configured to transport the plurality of objects from the washer at least partially to the dryer.

* * * * *